United States Patent
Huang et al.

(10) Patent No.: US 9,576,609 B2
(45) Date of Patent: Feb. 21, 2017

(54) SUBTITLE PROCESSING DEVICE AND ASSOCIATED METHOD AND SUBTITLE PARSING METHOD

(71) Applicant: MStar Semiconductor, Inc., Hsinchu Hsien (TW)

(72) Inventors: Chin-Yi Huang, Hsinchu Hsien (TW); Hung-Chang Chiu, Hsinchu Hsien (TW); Chih-Hsien Yao, Hsinchu Hsien (TW); Tsung-Chin Shih, Hsinchu Hsien (TW)

(73) Assignee: MStar Semiconductor, Inc., Hsinchu Hsien (TW)

( * ) Notice: Subject to any disclaimer, the term of this patent is extended or adjusted under 35 U.S.C. 154(b) by 0 days.

(21) Appl. No.: 14/849,801

(22) Filed: Sep. 10, 2015

(65) Prior Publication Data

US 2016/0086636 A1    Mar. 24, 2016

(30) Foreign Application Priority Data

Sep. 18, 2014    (TW) .............................. 103132241 A

(51) Int. Cl.
| | | |
|---|---|---|
| *G11B 27/34* | (2006.01) | |
| *G11B 27/10* | (2006.01) | |
| *H04N 9/82* | (2006.01) | |
| *G11B 27/32* | (2006.01) | |

(52) U.S. Cl.
CPC ........... *G11B 27/105* (2013.01); *G11B 27/102* (2013.01); *G11B 27/329* (2013.01); *G11B 27/34* (2013.01); *H04N 9/8205* (2013.01); *H04N 9/8233* (2013.01)

(58) Field of Classification Search
None
See application file for complete search history.

(56) References Cited

U.S. PATENT DOCUMENTS

| | | | | |
|---|---|---|---|---|
| 2006/0088293 A1* | 4/2006 | Huang | ................. | H04N 9/8233 386/245 |
| 2009/0310021 A1* | 12/2009 | Kondo | ............... | H04N 5/44513 348/564 |

(Continued)

FOREIGN PATENT DOCUMENTS

| | | |
|---|---|---|
| CN | 101764952 A | 6/2010 |
| CN | 102739997 A | 10/2012 |

OTHER PUBLICATIONS

TIPO Office Action, Nov. 23, 2015, 8 pages.

*Primary Examiner* — Eileen Adams
(74) *Attorney, Agent, or Firm* — Edell, Shapiro & Finnan, LLC

(57) ABSTRACT

A subtitle processing method includes a subtitle parsing step and a subtitle reading step. The subtitle parsing step includes: dividing a subtitle file into a plurality of subtitle blocks, each of the subtitle blocks including a plurality of subtitle contents, each of the subtitle contents corresponding to a subtitle time; generating an index table that records characteristic times of the subtitle blocks. The subtitle reading step, for reading a target subtitle content corresponding to a current time, includes: identifying a target subtitle block corresponding to the current time and the characteristic times recorded in the index table; and reading the target subtitle content of the target subtitle block according to the current time.

15 Claims, 11 Drawing Sheets

(56) References Cited

U.S. PATENT DOCUMENTS

2009/0316046 A1* 12/2009 Yamazaki ............ G11B 27/036
  348/468
2012/0309527 A1* 12/2012 Donnell ................. A63F 13/46
  463/31

* cited by examiner

SUBTITLE PROCESSING DEVICE AND ASSOCIATED METHOD AND SUBTITLE PARSING METHOD

This application claims the benefit of Taiwan application Serial No. 103132241, filed Sep. 18, 2014, the subject matter of which is incorporated herein by reference.

BACKGROUND OF THE INVENTION

Field of the Invention

The invention relates in general to subtitles, and more particularly to a subtitle processing device and associated method and a subtitle parsing method.

Description of the Related Art

Subtitles may be categorized into embedded subtitles and plug-in subtitles. Embedded subtitles are a part of a video file. For example, a video file may include a video section, an audio section and a subtitle section. Such subtitle section cannot be directly accessed by general users. Plug-in subtitles are a file independent from the video file, and can be directly edited by users. For example, users may adjust the time or texts of the plug-in subtitles. There are various formats for plug-in subtitle files, e.g., ".srt", ".smi", ".sub" and ".txt" are some common file extensions of subtitle files. According to different formats, one plug-in subtitle file may include one set or multiple sets of subtitles. One set of subtitles represent a set of complete subtitles of a video. For example, Japanese subtitles, Traditional Chinese subtitles or Simplified Chinese subtitles are individually one set of subtitles. Each subtitle unit of one set of subtitles usually includes a starting time, an ending time and subtitle contents, or associated variations. FIG. 1A shows a schematic diagram of contents of a conventional subtitle file in an ".srt" format. The subtitle file at least includes a subtitle unit 110 and a subtitle unit 120, which respectively includes starting times 112 and 122, ending times 114 and 124, and subtitle contents 116 and 126. When a current playback time of a video reaches the starting time, the corresponding subtitle contents are displayed on a screen; when the current playback time of the video reaches the ending time, the corresponding subtitle contents are cleared from the screen. FIG. 1B shows a schematic diagram of a conventional subtitle file in a ".sub" format. The subtitle file at least includes a subtitle unit 130 and a subtitle unit 140, which respectively include starting time 132 and 142, ending time 134 and 144, and subtitle contents 136 and 146. It should be noted that, the starting time and the ending time are not directly displayed by hour, minute and second, and need to be converted. A basic column 150 records a conversion method. In this example, 25 frames represent 1 second. Thus, the subtitle contents 136 are in fact displayed from the $1^{st}$ second to the $2^{nd}$ second, and so forth.

FIG. 2 shows a diagram of configuration of a conventional memory for processing subtitles. A memory 200 is disposed in a playback device, and is for parsing and displaying subtitles. The memory 200 includes a subtitle section 210 and an index section 220. In general, the playback device supports a fixed number of sets of subtitles. Four sets of subtitles are used here as an example. The subtitle contents of these four sets of subtitles are respectively temporarily stored in subtitle sub-sections 212, 214, 216 and 218. The four sets of subtitles have respective corresponding indices respectively stored in index sub-sections 222, 224, 226 and 228. A temporary storage sub-section 211 is for temporarily storing a subtitle unit to be parsed when the playback device parses the subtitle file. Details of purposes of the memory sections are given with reference to a flowchart of processing subtitles. FIG. 3 shows a flowchart of a conventional subtitle parsing method. Before a video is played, a controller (e.g., a microprocessor or a central processing unit (CPU)) of a playback device parses multiple sets of subtitles. During the parsing process, a part of the subtitle file is first temporarily stored in the temporary storage sub-section 211 of the memory 200, parsed subtitle contents of the part of the subtitle file are stored in one of the subtitle sub-sections 212, 214, 216 and 218, and an index is established and stored in the corresponding index sub-section. When the video is later played, the corresponding subtitles are identified from the memory according to the subtitles the user selects and then displayed. More specifically, one of the four sets of subtitle files are obtained from a storage medium (e.g., a flash memory, a hard drive or a solid-state hard drive) at the beginning of a subtitle process procedure (step S310). As the procedure is at an initial phase, the temporary storage sub-section 211 does not contain any data, and so step S320 and step S330 do not have any contents to be recorded. Thus, the subtitle processing procedure omits these two steps and performs step S340. At this point, it is discovered that the temporary storage sub-section 211 does not contain any data, and so step S360 is performed to determine whether the entire subtitle file is already parsed. Because the subtitle file is only starting to be read, a determination result of step S360 is negative and the procedure proceeds to step S370. In step S370, a part of the contents of the subtitle file is read from the memory medium to the temporary storage sub-section 211. In most circumstances, as the size of each subtitle file is greater than that of the temporary storage sub-section 211, one subtitle file needs to be read for a multiple number of times before it can be fully parsed. The subtitle unit then is identified from the temporary storage sub-section 211 (step S350). If the subtitle unit is identified, the subtitle contents of the subtitle unit are stored in the subtitle sub-section 212 (step S320), and the starting time and ending time of the subtitle unit as well as the position of the subtitle unit in the memory 200 in the last step are recorded in the index sub-section 222 (step S330), thus completing parsing one subtitle unit. When the data in the temporary storage sub-section 211 is not yet fully processed (step 340), a next subtitle unit is identified (step S350) until the data in the temporary storage sub-section 211 is fully processed. It is then determined whether the current subtitle file is completely parsed (step S360). If so, it means that the current subtitle file is completely parsed; if not, step S370 is iterated to read another part of the contents of the subtitle file from the memory medium to the temporary storage sub-section 211. Having completed parsing the current subtitle file, the above process is repeated to parse the other three subtitle files, and the data obtained from parsing is filled into the subtitle sub-sections 214, 216 and 218 as well as the index sub-sections 224, 226 and 228.

FIG. 4 shows a flowchart of a conventional method for searching for subtitles when playing a video. After starting to play the video, the corresponding index sub-section (e.g., the index sub-section 224) is identified according to the selected subtitles (step S410), the position of the subtitle contents to be displayed in the subtitle sub-section 214 is identified from the index according to the current playback time (step S420), the subtitle contents are read and a playback interface is notified to play the read subtitle contents (step S430), and it is determined whether the video is completely played (step S440). The process ends when the video is completely played, or else contents of next subtitle contents to be displayed are search for.

In conclusion, the memory 200 is an exclusive memory used for displaying subtitles, and has a fixed size that is determined at the time of completing the system and cannot be readily expanded, meaning that the number of sets of subtitles supported cannot be easily increased by later increasing the memory. Thus, the above conventional memory configuration and processing method for subtitles only allow a playback device to support a fixed number of sets of subtitles (e.g., four sets in the above example). Further, in the conventional method, all subtitle contents of one set of subtitles are temporarily stored in the subtitle sub-section, and so one subtitle sub-section usually needs 256 KB or more storage space. Further, information of index table is quite complicated (including the starting time and the ending time of each subtitle unit as well as the position of the subtitle contents in the memory). Therefore, one index sub-section usually needs to occupy 128 KB or more storage space, and about 1.5 MB or more storage space is required to support four sets of subtitles. In addition, the conventional solution stores all of the multiple sets of subtitles supported in different subtitle subsections, and the memory space occupied by three of the four sets of subtitles is equivalently wasted if only one of the four sets of subtitles are used in the playback process. Such issue of waste is aggravated when the number of sets of subtitles supported gets larger.

SUMMARY OF THE INVENTION

In view of the shortcomings of the prior art, it is an object of the present invention to provide a subtitle processing device and an associated method and a subtitle parsing method to increase flexibilities and save memory for subtitle processing.

The present invention discloses a subtitle processing method. The method includes a subtitle parsing step and a subtitle reading step. The subtitle parsing step includes: dividing a subtitle file into a plurality of subtitle blocks, each of the subtitle blocks including a plurality of subtitle contents, each of the subtitle contents corresponding to a subtitle time; and generating an index table that records characteristic times of the subtitle blocks, each of the characteristic times being associated with one of the subtitle times. The subtitle accessing step, for reading a current subtitle content corresponding to a current playback time, includes: identifying a target subtitle block corresponding to the current time according to the current playback time and the characteristic times recorded in the index table, and reading the target subtitle content of the current subtitle block according to the current playback time.

The present invention further discloses a subtitle parsing method. The method includes: dividing a subtitle file into a plurality of subtitle blocks, each of the subtitle blocks including a plurality of subtitle contents, each of the subtitle blocks corresponding to a subtitle time; and generating an index table that records characteristic times of the subtitle blocks, each of the characteristic times being associated with one of the subtitle times. A target subtitle content to be displayed when playing a video is generated according to the characteristic times recorded in the index table.

The present invention further discloses a subtitle processing device adapted to parse a subtitle file and to read a target subtitle content according to a current playback time. The device includes: a processing unit, configured to divide a subtitle file into a plurality of subtitle blocks to generate an index table, the index table recording characteristic times of the subtitle blocks, to identify a target subtitle block corresponding to the current playback time from the subtitle blocks according to the current playback time and the characteristic times recorded in the index table, and to read the target subtitle content from the target subtitle block according to the current playback time, wherein each of the subtitle blocks includes a plurality of subtitle blocks, each of the subtitle contents corresponds to a subtitle time, and each of the characteristic times is associated with one of the subtitle times; and a memory, including a first memory section configured to store the index table and a second memory section configured to store the subtitle contents included in the target subtitle block.

The subtitle processing device and the associated method and the subtitle parsing method of the present invention are capable of quickly establishing an index table of subtitles to significantly reduce the time for parsing the subtitles. Further, in the present invention, without having to store all subtitle contents of the subtitles into a memory, the subtitle contents currently required are dynamically read and stored to the memory during a playback process, thereby greatly decreasing the amount of memory used. Further, as the index table occupies an extremely small space, only a small memory space preserved is sufficient for easily increasing the number of sets of subtitles supported without noticeably increasing system costs.

The above and other aspects of the invention will become better understood with regard to the following detailed description of the preferred but non-limiting embodiments. The following description is made with reference to the accompanying drawings.

DETAILED DESCRIPTION OF THE INVENTION

Technical terms of the application are based on the general definition in the technical field of the application. If the application describes or explains one or some terms, definitions of the terms are based on the description or explanation of the application.

The present invention discloses a subtitle processing device, a subtitle processing method and a subtitle parsing method capable of quickly parsing subtitles using a small memory space. The device and method of the present invention may be applied to a video playback device. In possible implementation, one skilled person in the art may choose equivalent devices or steps to implement the disclosure based on the disclosure of the application. That is, the implementation of the disclosure is not limited in the embodiments described in the disclosure. Further, a part of the elements included in the subtitle processing device of the disclosure may be individually known. Without affecting the full disclosure and possible implementation of the subtitle processing device, the known details are omitted. Further, the subtitle processing method and the subtitle parsing method of the present invention may be implemented by the subtitle processing device of the disclosure or an equivalent device. Without affecting the full disclosure and possible implementation of the method, the description of the method focuses on the steps instead of hardware.

Figure 1A:
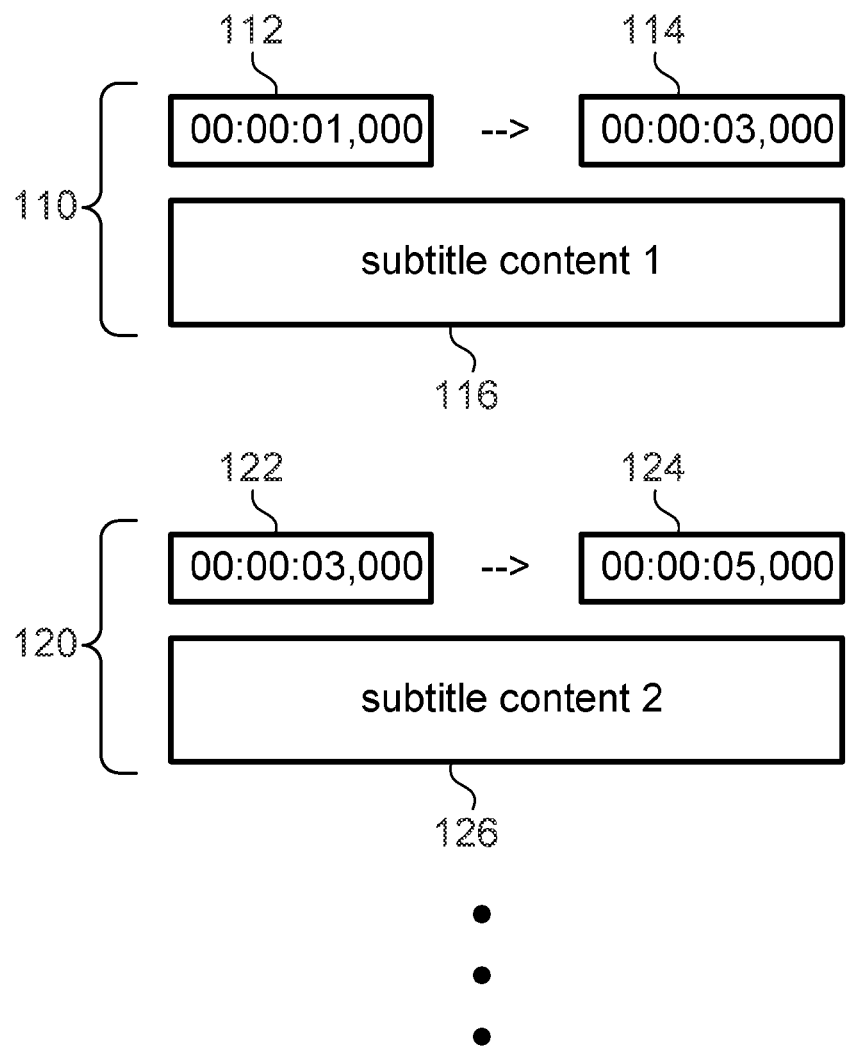
FIG. 1A is a schematic diagram of a conventional subtitle file in an ".srt" format.
Figure 1B:
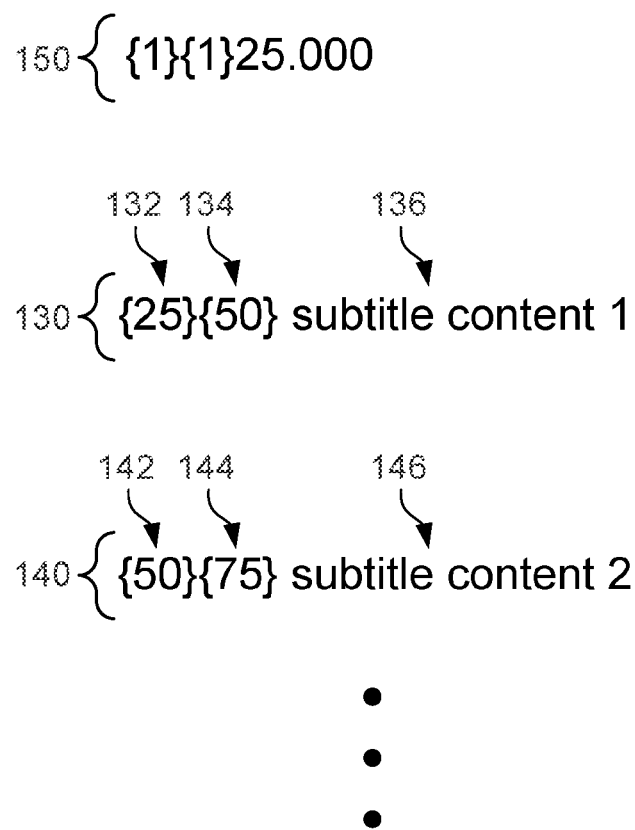
FIG. 1B is a schematic diagram of a conventional subtitle file in an ".sub" format.
Figure 2:
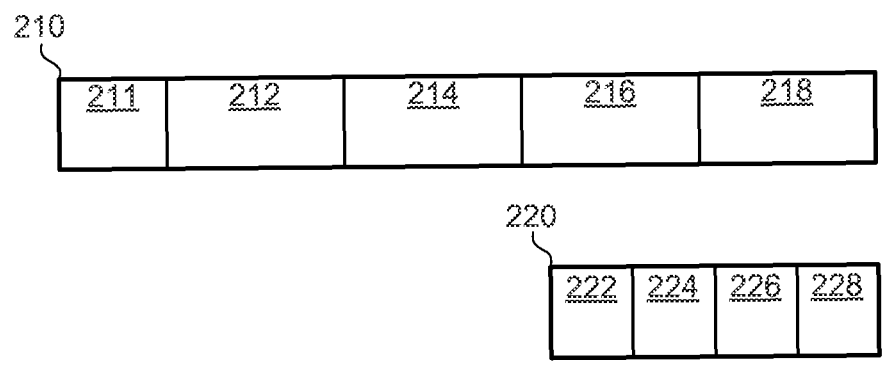
FIG. 2 is a diagram of configuration of a memory conventionally applied for subtitle processing.
Figure 3:
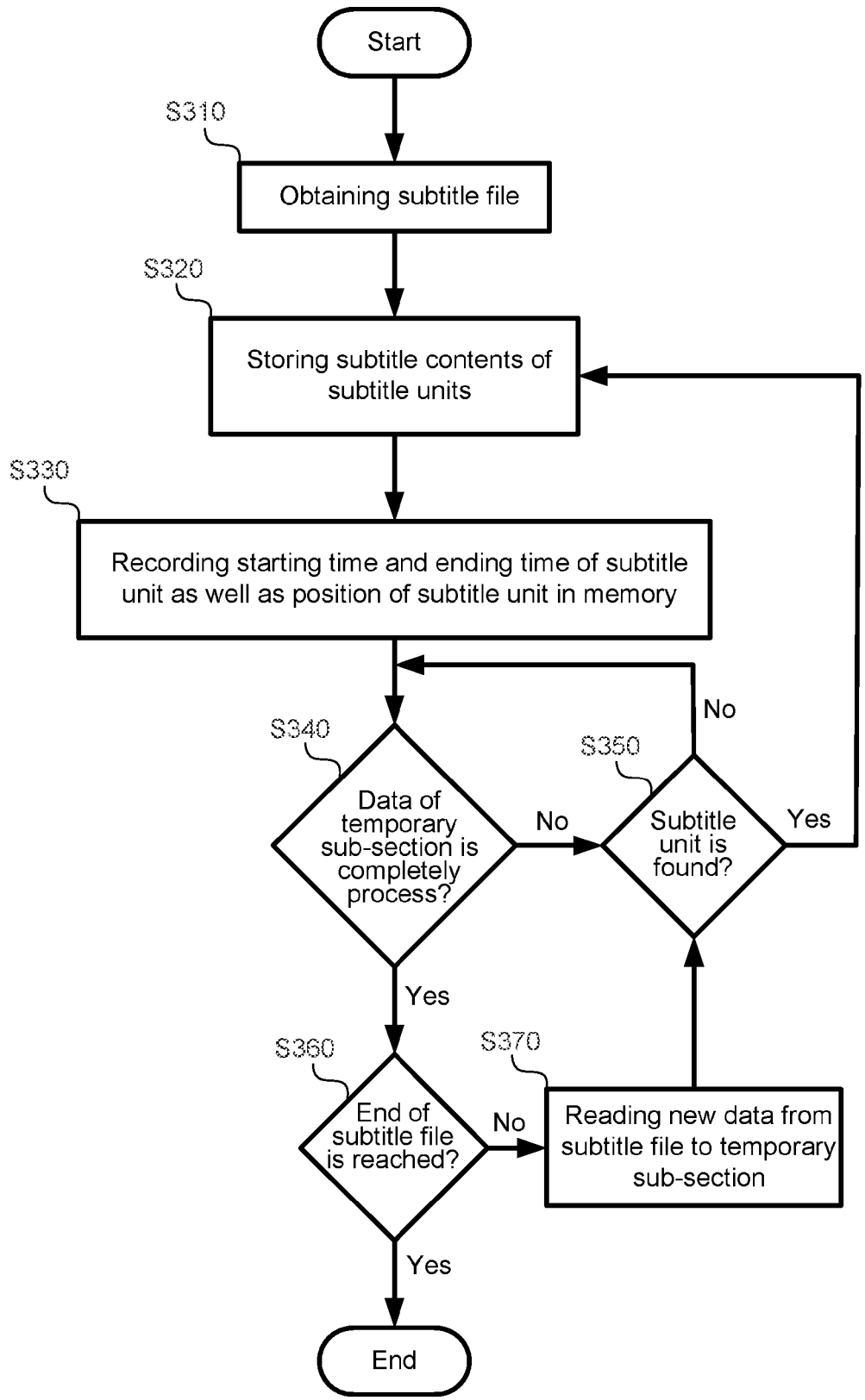
FIG. 3 is a flowchart of a conventional subtitle parsing method.
Figure 4:
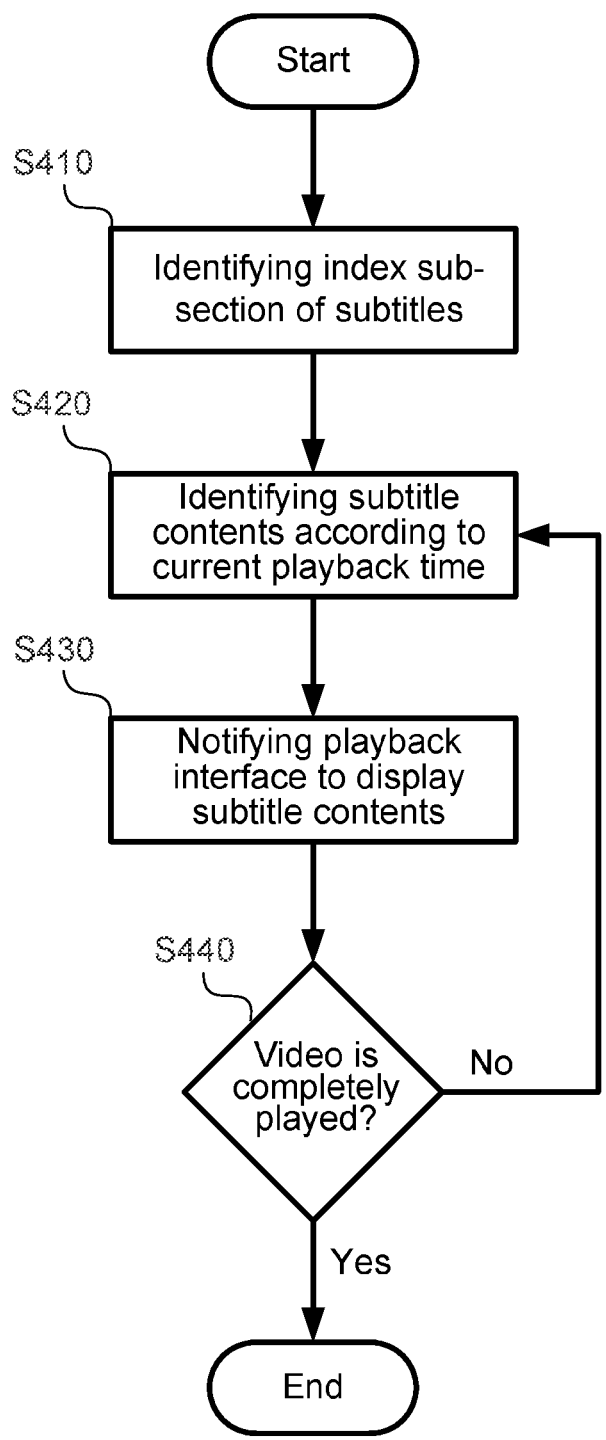
FIG. 4 is a flowchart of a conventional method for searching for subtitles when playing a video.
Figure 5:
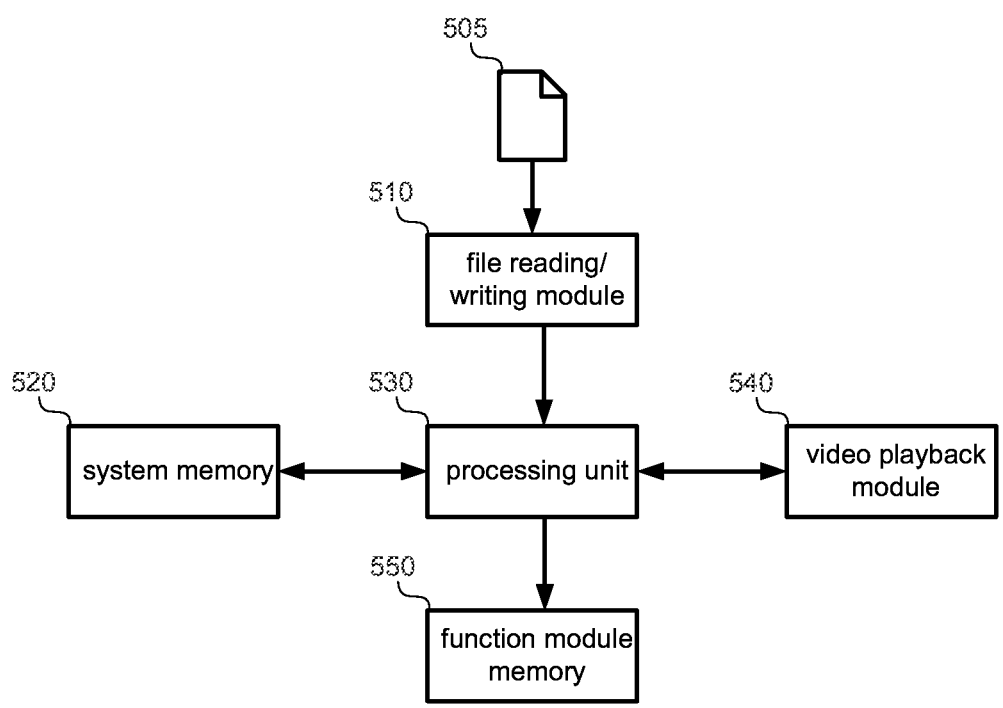
FIG. 5 is a functional block diagram of a subtitle processing device according to an embodiment of the present invention.
Figure 6:
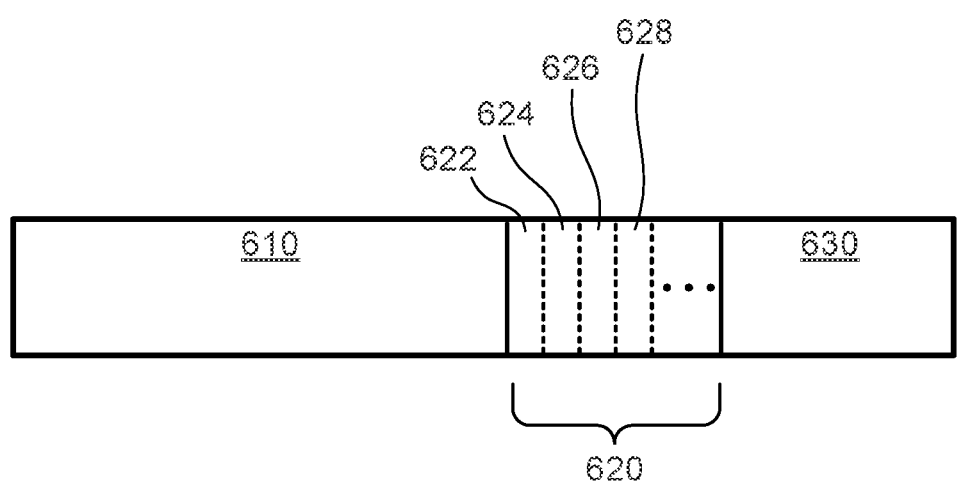
FIG. 6 is a diagram of configuration of a hardware memory for subtitle processing of the present invention.

FIG. 5 shows a functional block diagram of a subtitle processing device according to an embodiment of the present invention. The subtitle processing device may be a part of a video playback device. For example, but not limited to, the video playback device is a television or a multimedia player. The subtitle processing device includes a file reading/writing module 510, a system memory 520, a processing unit 530, a function module memory 540 and a video playback module 550. For example, the processing unit 530 is a central processing unit (CPU) or a microcontroller (also referred to as a microprocessor). The system memory 520 stores system data or program codes when the video playback device operates. The function module memory 540 is an exclusive memory that the video playback device uses for subtitle processing, and cannot be shared with other functional modules. The video playback module 550 controls video playback and subtitle display. The file reading/writing module 510 accesses a subtitle file 505 from a hard drive or flash memory. The system memory 520 and the function module memory 540 may be different sections in a same physical memory, or may be two independent physical memories. FIG. 6 shows a diagram of configuration of a hardware memory for subtitle processing of the present invention. The function module memory 540 includes a temporary storage section 610, an index section 620 and a subtitle unit section 630. The temporary storage section 610 temporarily stores a part of data of the subtitle files during subtitle parsing. The index section 620 stores an index table generated after subtitle parsing. One index table is obtained from one set of subtitles. The index table generated according to the present invention occupies a small memory space. Besides, once one set of subtitles are parsed, only the corresponding index table is stored instead of also storing the corresponding subtitle contents. Therefore, to support multiple sets of subtitles, the memory space the present invention needs is still quite small. The subtitle unit section 630 temporarily stores multiple subtitle units when the video is played.

Figure 7:
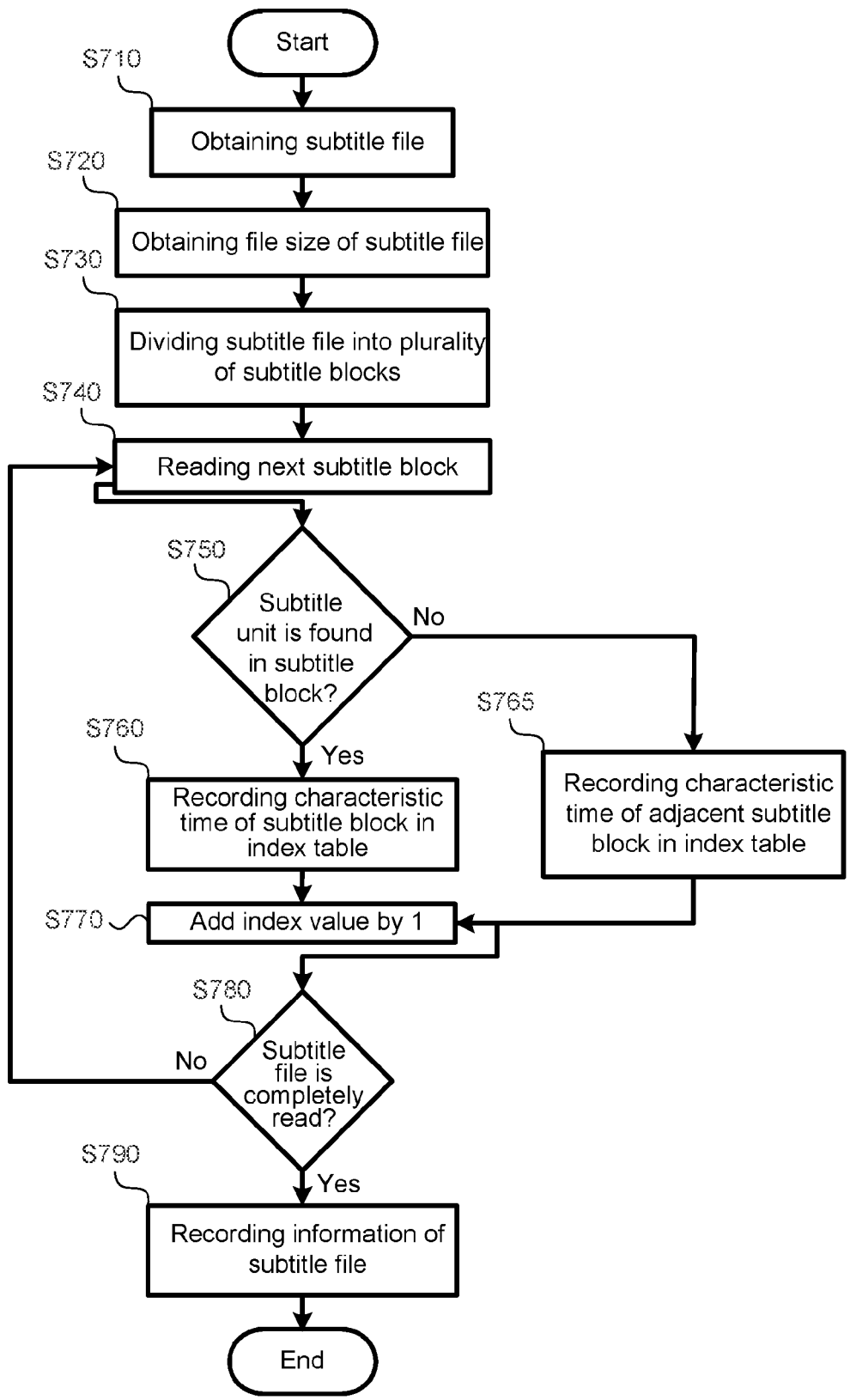
FIG. 7 is a flowchart of a subtitle parsing method according to an embodiment of the present invention.
Figure 8:
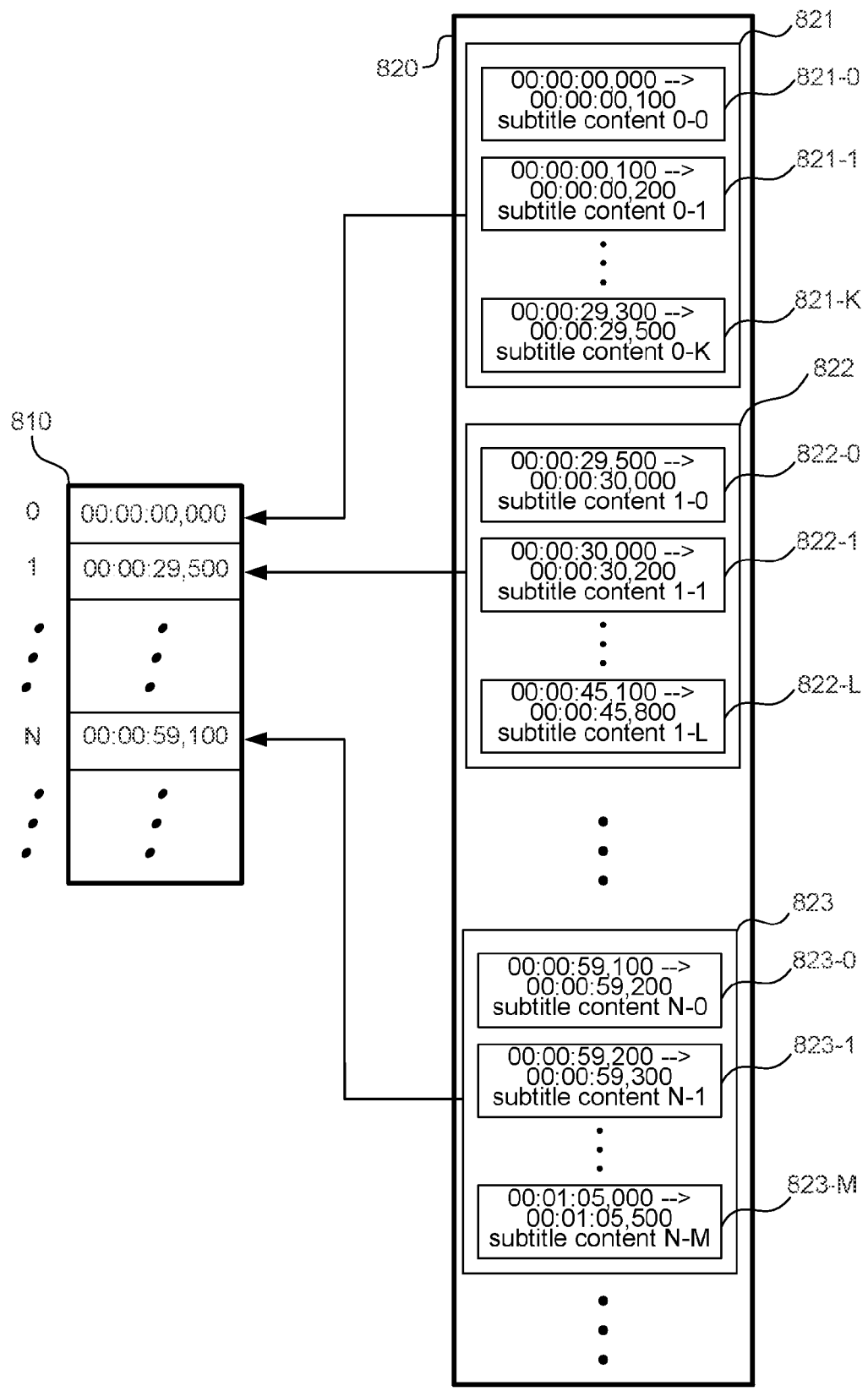
FIG. 8 is a mapping diagram of an index table and subtitle files according to an embodiment of the present invention.

FIG. 7 shows a flowchart of a subtitle parsing method according to an embodiment of the present invention. FIG. 8 shows a mapping diagram of an index table and subtitle files according to an embodiment of the present invention. To parse subtitles, a subtitle file to be parsed is obtained (step S710), a file size of the subtitle file is obtained after the subtitle file to be parsed is obtained (step S720), and the subtitle file is divided into a plurality of subtitle blocks (step S730). In a preferred embodiment, the number of blocks to be divided is predetermined (e.g., X, where X is a positive integer). The number of blocks is associated with the size of the index table and the time needed for parsing the subtitle file. Assuming that the size of the subtitle file is F, the size of each block is equal to or substantially equal to F/X. The contents of the subtitle file is read and temporarily stored into the temporary storing section 610, and then parsed. The size of the temporary storing section 610 may be designed to be the size of a memory that one subtitle display occupies, i.e., the size occupied by one subtitle unit (e.g., 16 KB). Thus, if one subtitle block occupies 10 subtitle units, the subtitle block can be fully parsed after 10 reading operations. However, the temporary storing section 610 may be designed to have a larger size to save the time. For example, the size of the temporary storing section 610 may be designed to be greater than or equal to the size of the blocks, and each block can then be fully parsed by 1 reading operation. In practice, the size of the temporary storing section 610 may be adjusted according to the size F of the subtitle file. Taking an actual number of example, assuming that the predetermined number of blocks is 256 and the size of the subtitle file does not exceed 4 MB, the size of each block is then smaller than 16 KB (4 MB/256). Thus, the size of the temporary storing section 610 may be designed to be 16 KB. However, assuming that the number of blocks is similarly 256 and the size of the subtitle file is between 4 MB and 8 MB, the size of the temporary storing section 610 may then be designed to be 32 KB (8 MB/256) to save the time, or may be still designed to be 16 KB to save memory. In another preferred embodiment, the subtitle file is read in a unit of the size of the temporary storing section 610. Assuming that the size of the subtitle file is F and the size of the temporary storing section 610 is R, the subtitle file is then divided into F/R blocks. For example, the temporary storing section 610 is capable of concurrently storing one subtitle block, the number of blocks is then F/R. However, if the temporary storing section 610 can concurrently store 2 subtitle blocks, the number of blocks is F/2R. Further, to ensure that the number of the blocks does not exceed a predetermined threshold associated with the size of the index table, the size of the temporary storing section 610 needs to be adjusted according to the size of the subtitle file. Taking an actual number for example, assuming that the size of the subtitle file does not exceed 4 MB and the size of the temporary storing section 610 is 16 KB, the subtitle file may then be divided into a maximum of 256 (4 MB/16 KB) blocks. However, if the size of the subtitle file is between 4 MB and 8 MB and the number of blocks is to be controlled to be within 256, the size of the temporary storing section 610 is preferably greater than 32 KB. Alternatively, if one subtitle block is divided to be read by a multiple reading operations, the size of the temporary storing section 610 may be designed to be smaller than 32 KB (e.g., each subtitle block is divided to be read by two reading operations, and the size of the temporary storing section 610 is designed to be 16 KB). Regardless the method used, the subtitle file is divided into a plurality of blocks. As shown in FIG. 8, a subtitle file 820 is divided into at least N+1 subtitle blocks (including a $0^{th}$ subtitle block 821, a $1^{st}$ subtitle block 822 and an $N^{th}$ subtitle 823), where N is a positive integer greater than or equal to 1. Each of the subtitle blocks includes a plurality of subtitle units, e.g., the subtitle block 821 includes a total of K+1 subtitle units 821-0 to 821-N, and the subtitle blocks 822 and 823 include L+1 and M+1 subtitle units, respectively, wherein K, L and M are positive integers. It should be noted that, K, L and M may be or may not be equal. That is, the subtitle blocks may include the same number of different numbers of subtitle units, or some subtitle blocks may include only 1 subtitle unit or do not include any subtitle unit at all (storing other data of the subtitle file).

Again referring to FIG. 7, after the subtitle file is divided into a plurality of blocks (step S730), the subtitle blocks are then read (step S740). When step S740 is performed for the first time, the first subtitle block (e.g., the subtitle block 0 in FIG. 8) is read. When step S740 is later again performed, other subtitle blocks are sequentially read according to the times of the subtitle units in the subtitle file in an increasing order. A subtitle unit is searched for in the subtitle blocks (step S750). When a subtitle unit is found, the characteristic time of the subtitle block is recorded in an index table 810 (step S760). The characteristic time may be the time of a subtitle unit. For example, but not limited to, the characteristic time is the time of an earliest subtitle unit or the time of a latest subtitle unit in a subtitle block. In one preferred embodiment, as shown in FIG. 8, the characteristic time is the time of the earliest subtitle unit in the subtitle block, and so the index table 810 records the characteristic time 00:00:00, 000 of the $0^{th}$ subtitle block 821. When the subtitle unit is not found in step S750, it means that the subtitle block does not have a characteristic time, and the characteristic time of the subtitle block adjacent to that subtitle block is used as the characteristic time of that subtitle block (step S765). In one preferred embodiment, when the subtitle block does not include any subtitle units, the characteristic time of the previous subtitle block is directly used as the characteristic time of the subtitle block. In another preferred embodiment, the characteristic time of the subtitle block is first left empty in the index table, and a newly obtained characteristic time is filled back to the empty space when the characteristic time of a next subtitle block is obtained. When the index table is later read and it is discovered that two or more successive subtitle block correspond to the same characteristic time, only the subtitle with the smallest number (corresponding to the characteristic time from a previous characteristic time) or a largest number (corresponding to the newly obtained characteristic time filled back in) is read according a rule at the time of filling in the characteristic time. When the index 810 has recorded the characteristic time of the current subtitle block, the index value is added by 1 (step S770) to get ready to fill in the characteristic time of the next subtitle block. That is, the characteristic time is filled into index table according to the sequence of reading the subtitle blocks in step S740. It should be noted that, step S740 may need to read the same subtitle block once (e.g., when the temporary storing section 610 is greater than or equal to the size of one subtitle block) or multiple times (e.g., when the temporary storing section 610 is smaller than the size of one subtitle block). Further, when the temporary storing section 610 is smaller than the size of one subtitle block, it is possible that the subtitle block is only read once. For example, when the characteristic time is the time of the earliest subtitle unit of the subtitle block, only a frontmost part of the subtitle block is read while the rest part is omitted to reduce parsing time.

It is then determined whether the subtitle file 820 is completely read (step S780). If not, the process continues to read the next subtitle block (step S740). If the subtitle file 820 is completely read, information of the subtitle file 820 is recorded (step S790), e.g., an encoding format (ASCII, Unicode, or UTF-8), a subtitle file format (".srt", or ".smi) and a row count of the index table. As such, one subtitle file is fully parsed. The generated index table is stored into an index sub-section (one of the index sub-sections 622, 624, 626 and 628) in the index subsection 620. As the information stored in the index table of the present invention is quite simple (each characteristic time only occupies a 4 B (Bytes) storage space, and the index table is only 4 B×256=1 KB if there are a total number of 256 subtitle blocks), the index section 620 only requires a 8 KB storage space when a maximum number of 8 sets of subtitles are supported. Therefore, compared to the conventional solution that requires a 128 KB×8 storage space, the present invention significantly saves memory.

Figure 9:
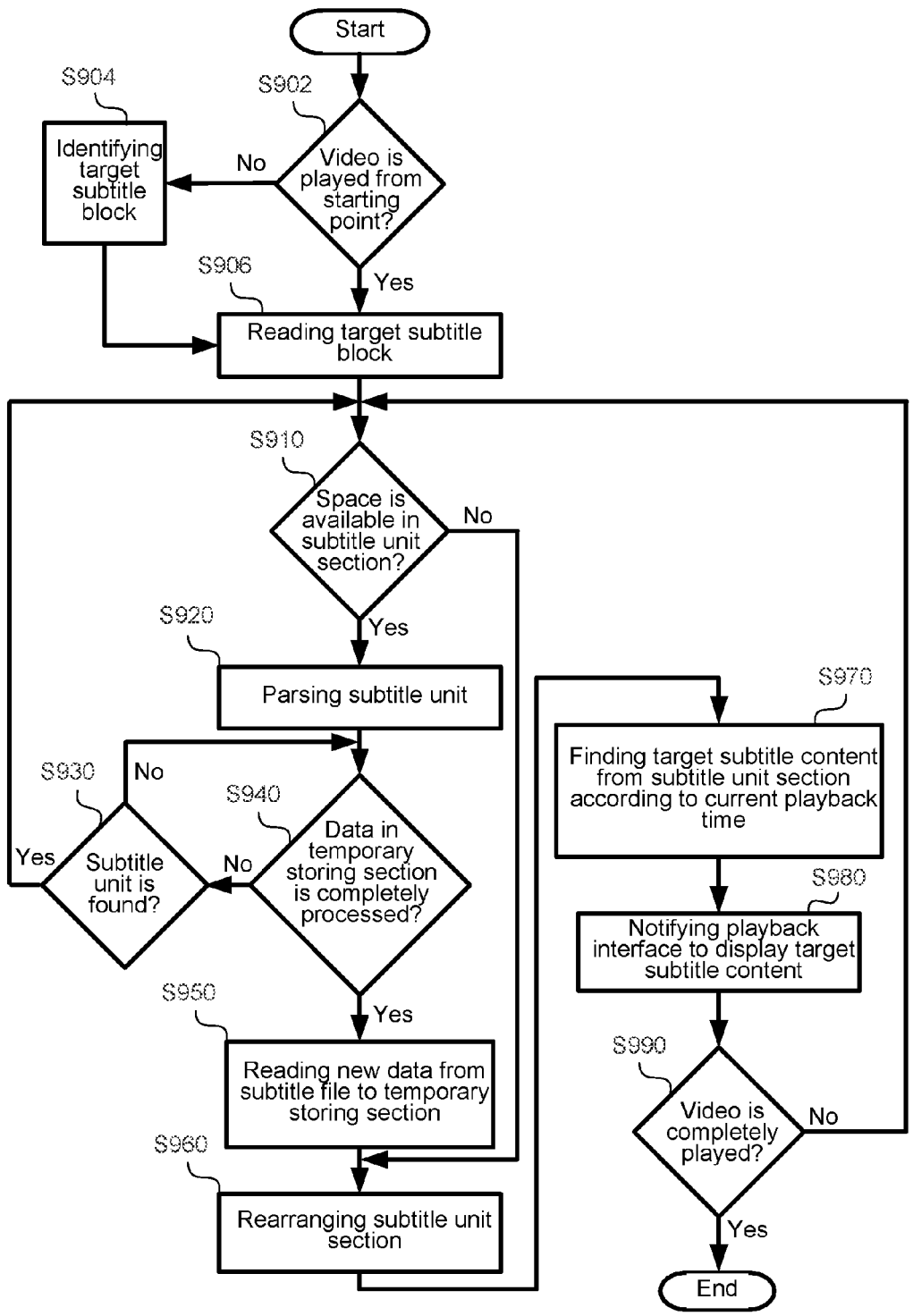
FIG. 9 is a flowchart of a method for searching for subtitles when playing a video according to an embodiment of the present invention.
Figure 10:
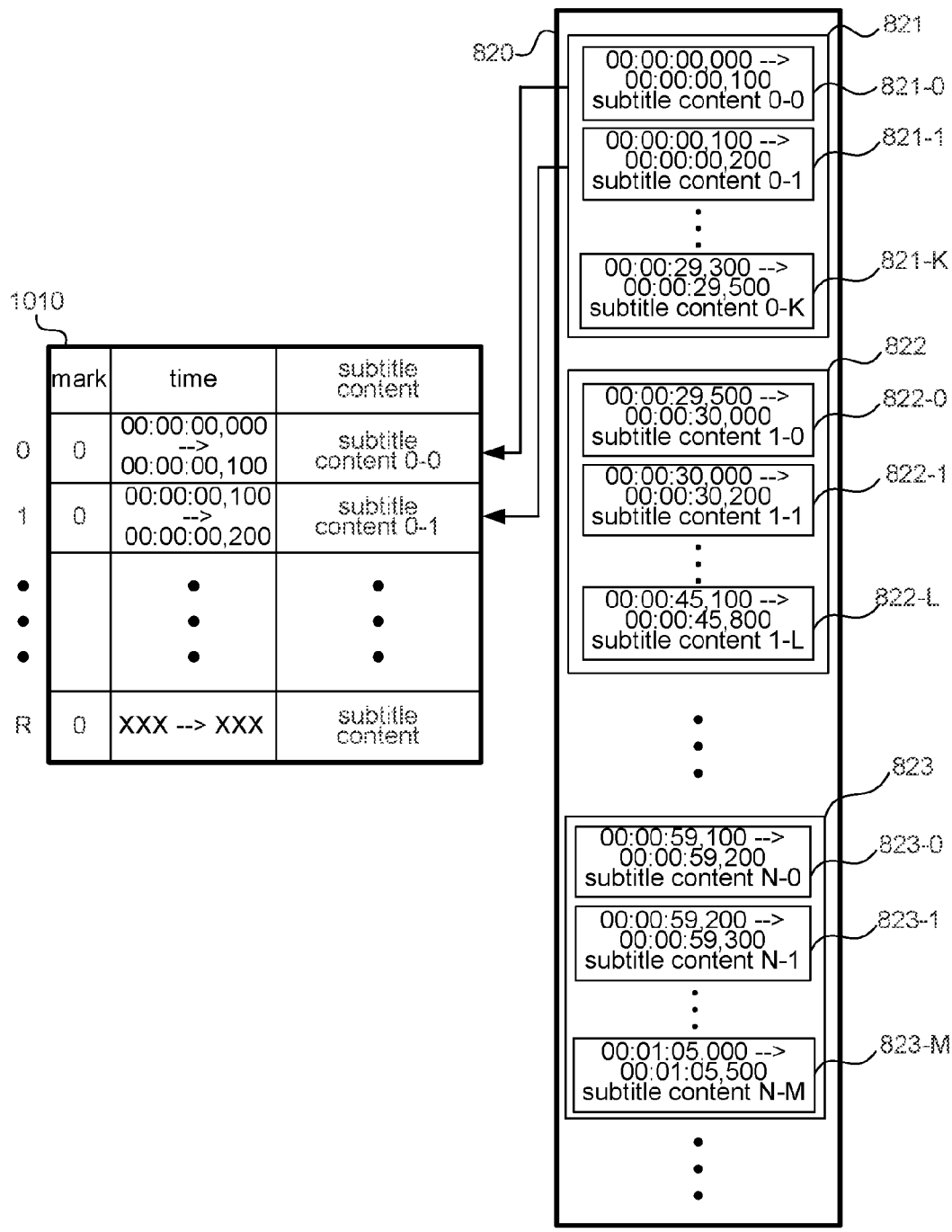
FIG. 10 is a mapping diagram of temporarily stored contents in subtitle unit sections and subtitle files when playing a video according to an embodiment of the present invention.

FIG. 9 shows a flowchart of a method for searching for subtitles when playing a video according to an embodiment of the present invention. FIG. 10 shows a mapping diagram of temporarily stored contents in the subtitle section 630 and a subtitle file when playing a video according to an embodiment of the present invention. When a video begins to play, a playback device first determines whether the video is played from a starting point (step S902). If so, a target subtitle block is read (reading the $0^{th}$ target block 821 at this point); if not, the target subtitle block is searched for from the index table 810 according to the current playback time (step S904). For example, the video is played from the time 00:01:00,700 according to the index table. At this point, step S904 identifies the $N^{th}$ subtitle block 823 as the current target subtitle block. The searching process may be in a sequential search, a binary search or a search according to other algorithms. During the reading process, data of the subtitle block may be read all at once or by several times according to a relationship between the sizes of the subtitle block and the temporary storing section 610. After reading the target subtitle block and temporarily storing the target subtitle block in the temporary storing section 610 (step S906), it is determined whether there is available space in the subtitle unit section 630 (step S910). Contents stored in the subtitle unit section 630 are as shown in a mapping table 1010, with one row of data corresponding to one subtitle unit. For example, in the $0^{th}$ row in the mapping table, the time corresponds to the starting and ending times of the subtitle unit 821-0, the subtitle contents correspond to the subtitle unit 821-0, and the mark is for indicating whether the subtitle unit has expired (i.e., already displayed, e.g., bit 0 indicates already displayed and bit 1 indicates not yet displayed). Step S910 may have different determination methods. For example, it is determined that there is no available space when every row of the subtitle unit section 630 contains data, and step S960 is performed to rearranged the subtitle unit section 630. Alternatively, although every row of the subtitle unit section 630 contains data, some of the data may be indicated as expired and may then be overwritten. At this point, it can be determined that there is available space in the subtitle unit section 630. The size of the subtitle unit section 630 may be flexibly designed according to a principle that an appropriate number of subtitle units are stored to allow correct and smooth subtitle display during a playback process. However, all subtitle contents of the target subtitle block may be simultaneously stored. In one preferred embodiment, the subtitle unit section 630 stores 16 subtitle units, i.e., the mapping table in FIG. 10 should have 16 rows (R=15). In an example where one row of data in average occupies 256 B storage space, the size of the subtitle unit section 630 is 8 KB.

The subtitle unit section 630 initially contains no data, and so step S920 is performed. In step S920, each of the subtitle units stored in the temporary storing section 610 is parsed, and information of that subtitle unit is filled into an appropriate field of the mapping table 1010 when that subtitle unit is read. It is then determined whether the data in the temporary storing section 610 has been completely processed (step S940). If not, a next subtitle unit is searched for from the temporary storing section 610 (step S930). Step S910 is performed when the next subtitle unit is found, or else step S940 is iterated if not found. When step S940 determines that the data in the temporary storing section 610 is completely processed, the next subtitle block is read from the subtitle file 821 and stored to the temporary storing section 610 (step S950). However, in steps S910 to S940 for parsing the subtitle units, if the data in the temporary storing section 610 is not completely processed and the subtitle unit section 630 is however fully filled, step S960 is performed. In step S960, the subtitle unit section 630 is rearranged. More specifically, the subtitle units already displayed or expired are indicated as "1" in the mapping table 1010. When step S910 is again performed and subtitle units indicated as "1" are discovered, it means that there is available space in the subtitle unit section 630. The subtitle units indicated as "1" may be cleared or overwritten. In following step S970, the target subtitle contents are searched for from the subtitle unit section 630 according to the current playback time. That is, the subtitle contents due for display are identified from the mapping tale 1010 according to the current playback time. For example, assuming that the current playback time is 00:00:00,105, step S970 reads the subtitle contents 0-1 as the target subtitle contents. After the target subtitle contents are found, the playback module is notified to display the target subtitle contents (step S980). It is then determined whether the video is completely played (step S990). The playback process ends if the video is completely played, or else returns to step S910 if not. In step S960, it is determined whether to rearrange the subtitle unit section 630 (step S960) or to parse a next subtitle unit in the temporary storing section 610 (step S920) according to current storage conditions of the subtitle unit section 630. The above steps S910 to S990 are repeated until the playback process of the video is complete. It should be noted that, step S960 is not necessarily performed between step S950 and step S970, and may be performed between step S970 and step S980 or between step S980 and step S990, or even performed between step S990 and step S910. In any of the above variations, step S970 is performed directly after step S950, and step S970 is performed when the determination result of step S910 is negative. That is to say, the step of rearranging the subtitle unit section 630 (step S960) may be performed before or after searching for the target subtitle contents (step S970) or displaying the target subtitle contents (step S980). More specifically, step S960 is performed at least once between determining that there is no available space in the subtitle unit section 630 (step S910) and again performing the same determination (when step S910 is again performed). Under such premise, step S960 may be selectively performed multiple times at other time points of the process, e.g., step S960 is performed again after searching for the subtitle unit (step S930).

In conclusion, the present invention provides a subtitle parsing method and a corresponding method for displaying subtitles, and these two methods may be performed by the subtitle processing device of the present invention. Compared to the prior art, in the present invention, a subtitle file is divided into a plurality of subtitle blocks when the subtitle file are parsed, and only the characteristic time corresponding to each subtitle block is recorded. Therefore, the present invention is capable of quickly completing the parsing process and generating a quite small index table for reducing memory space. Further, by storing the subtitle contents in a small data amount and sharing the same temporary storing section among multiple sets of subtitle files, the present invention significantly reduces the amount of memory used compared to the prior art.

One person skilled in the art can understand implementation details and variations of the device in FIG. 5 from the disclosure of the methods in FIG. 7 and FIG. 9. Without affecting full disclosure and implementation of the method of the present invention, repetitive details are omitted herein. It should be noted that, the shapes, sizes, ratios and sequences of the steps in the drawings are examples for explaining the present invention to one person skilled in the art, not limiting the present invention. In possible implementation, one skilled person in the art would selectively implement part or all technical features of any embodiment of the application or selectively combine part or all technical features of the embodiments of the application based on the disclosure of the present invention to enhance the implementation flexibility of the present invention.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A subtitle processing method, comprising:
   a subtitle parsing step, comprising:
      dividing a subtitle file into a plurality of subtitle blocks, each of the subtitle blocks comprising a plurality of subtitle contents, each of the subtitle contents corresponding to a subtitle time; and
      generating an index table that records characteristic times of the subtitle blocks, each of the characteristic times being associated with one of the subtitle times; and
   a subtitle reading step, for reading a target subtitle content corresponding to a current playback time, comprising:
      identifying a target subtitle block corresponding to the current playback time from the subtitle blocks according to the current playback time and the characteristic times recorded in the index table; and
      reading the target subtitle content of the target subtitle block according to the current playback time,
   wherein the step of reading the target subtitle contents of the target subtitle block according to the current playback time comprises:
   selecting a predetermined number of subtitle contents from the plurality of subtitle contents of the target subtitle block, and recording the subtitle times corresponding to the predetermined number of subtitle contents; and
   reading the target subtitle content of the predetermined number of subtitle contents according to the current playback time and the subtitle times; and
   further comprising:
   marking the target subtitle content; and
   replacing the marked target subtitle content by a new subtitle content to update the predetermined number of subtitle contents.

2. The subtitle processing method according to claim 1, wherein the step of dividing the subtitle file into the plurality of subtitle blocks comprises:
   obtaining a size of the subtitle file;
   determining a subtitle block size according to the size of the subtitle file; and reading the subtitle file in a unit of the subtitle block size to obtain the subtitle blocks.

3. The subtitle processing method according to claim 1, wherein the step of generating the index table comprises:
reading the subtitle blocks according to a sequence; and
recording the characteristic times of the subtitle blocks according to the sequence to generate the index table;
wherein, when an intermediate subtitle block of the subtitle blocks does not contain any subtitles, the step of recording the characteristic times of the subtitle blocks according to the sequence to generate the index table regards one of the characteristic time of a previous subtitle block of the intermediate subtitle block or the characteristic time of a next subtitle block of the intermediate subtitle block as the characteristic time of the intermediate subtitle block.

4. The subtitle processing method according to claim 1, wherein the characteristic times are one of a maximum value and a minimum value of the subtitle times corresponding to the subtitle contents included in the corresponding subtitle block.

5. A subtitle parsing method, comprising:
dividing a subtitle file into a plurality of subtitle blocks, each of the subtitle blocks comprising a plurality of subtitle contents, each of the subtitle contents comprising a subtitle time; and
generating an index table that records characteristic times of the subtitle blocks, each of the characteristic times being associated with one of the subtitle times;
wherein, a target subtitle content to be displayed when a video is played is selected according to the characteristic times recorded in the index table,
wherein the step of generating the index table comprises:
reading the subtitle blocks according to a sequence; and
recording characteristic times of the subtitle blocks according to the sequence to generate the index table;
wherein, when an intermediate subtitle block of the subtitle blocks does not contain any subtitles, the step of recording the characteristic times of the subtitle blocks according to the sequence to generate the index table regards one of the characteristic time of a previous subtitle block of the intermediate subtitle block or the characteristic time of a next subtitle block of the intermediate subtitle block as the characteristic time of the intermediate subtitle block.

6. The subtitle parsing method according to claim 5, wherein the step of dividing the subtitle file into the plurality of subtitle blocks comprises:
obtaining a size of the subtitle file;
determining a subtitle block size according to the size of the subtitle file; and
reading the subtitle file in a unit of the subtitle block size to obtain the subtitle blocks.

7. The subtitle parsing method according to claim 5, wherein the characteristic times are one of a maximum value and a minimum value of the subtitle times corresponding to the subtitle contents included in the corresponding subtitle block.

8. A subtitle processing device, adapted to parse a subtitle file and to read a target subtitle content according to a current playback time, comprising:
a processing unit, configured to divide a subtitle file into a plurality of subtitle blocks and to generate an index table, the index table recording characteristic times of the subtitle blocks; the processing unit configured to further identify a target subtitle block corresponding to the current playback time from the subtitle blocks according to the current playback time and the characteristic times recorded in the index table, and to read the target subtitle content from the target subtitle block according to the current playback time, each of the subtitle contents corresponding to a subtitle time, each of the characteristic times being associated with one of the subtitle times; and
a memory, comprising:
a first memory section, configured to store the index table; and
a second memory section, configured to store the subtitle contents included in the target subtitle block,
wherein the processing unit reads the subtitle blocks according to a sequence, and records the characteristic times of the subtitle blocks according to the sequence to generate the index table; when an intermediate subtitle block of the subtitle blocks does not contain any subtitles, the processing unit regards one of the characteristic time of a previous subtitle block of the intermediate subtitle block or the characteristic time of a next subtitle block of the intermediate subtitle block as the characteristic time of the intermediate subtitle block.

9. The subtitle processing device according to claim 8, wherein the index table corresponds to a set of subtitles included in the subtitle file, and the first memory section further stores another index table that corresponds to another set of subtitles.

10. The subtitle processing device according to claim 8, wherein the processing unit dynamically updates the second memory section according to the current playback time.

11. The subtitle processing device according to claim 8, wherein the memory further comprises:
a temporary storing section;
wherein, the processing unit divides the subtitle file in a unit of the temporary storing section into the subtitle blocks.

12. The subtitle processing device according to claim 11, wherein the processing unit determines a size of the temporary storing section according to a size of the subtitle file.

13. The subtitle processing device according to claim 8, wherein the processing unit selects a predetermined number of subtitle contents from the plurality of subtitle contents of the target subtitle block, obtains the subtitle times corresponding to the predetermined number of subtitle contents, stores the predetermined number of subtitle contents and the subtitle times to the second memory section, and reads the target subtitle content from the second memory section according to the current playback time and the subtitle times.

14. The subtitle processing device according to claim 13, wherein the processing unit marks the target subtitle content, and replaces the marked target subtitle content by a new subtitle content to update the predetermined number of subtitle contents.

15. The subtitle processing device according to claim 8, wherein the characteristic times are one of a maximum value and a minimum value of the subtitle times corresponding to the subtitle contents included in the corresponding subtitle block.

* * * * *